Feb. 23, 1937.  P. P. ESTERMYER, SR  2,072,046
AUTOMATIC RADIO RECEIVER
Filed July 13, 1934   9 Sheets-Sheet 2

Inventor
Peter P. Estermyer, Sr.

By Clarence A. O'Brien
Attorney

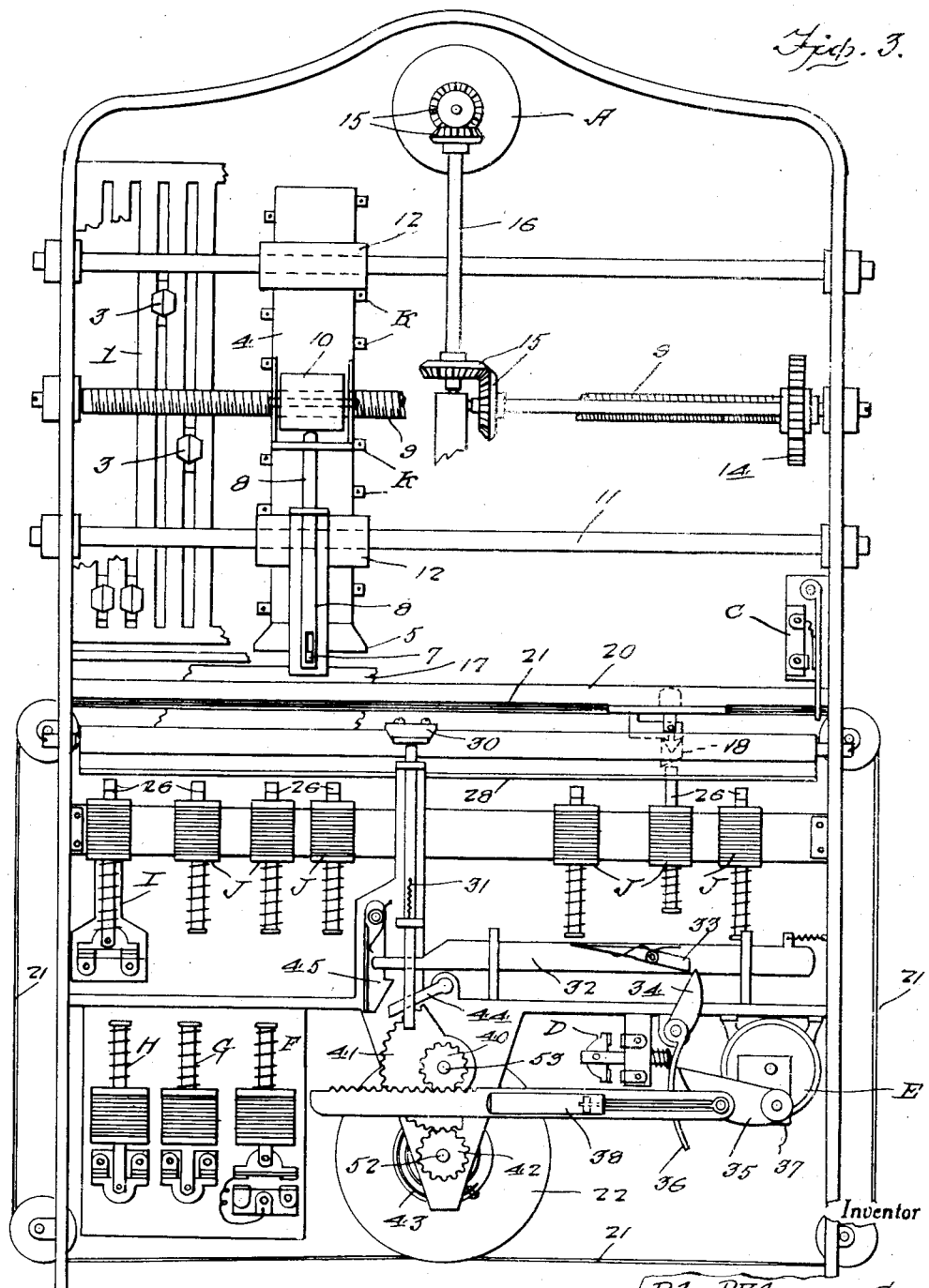

Feb. 23, 1937.  P. P. ESTERMYER, SR  2,072,046
AUTOMATIC RADIO RECEIVER
Filed July 13, 1934   9 Sheets-Sheet 4
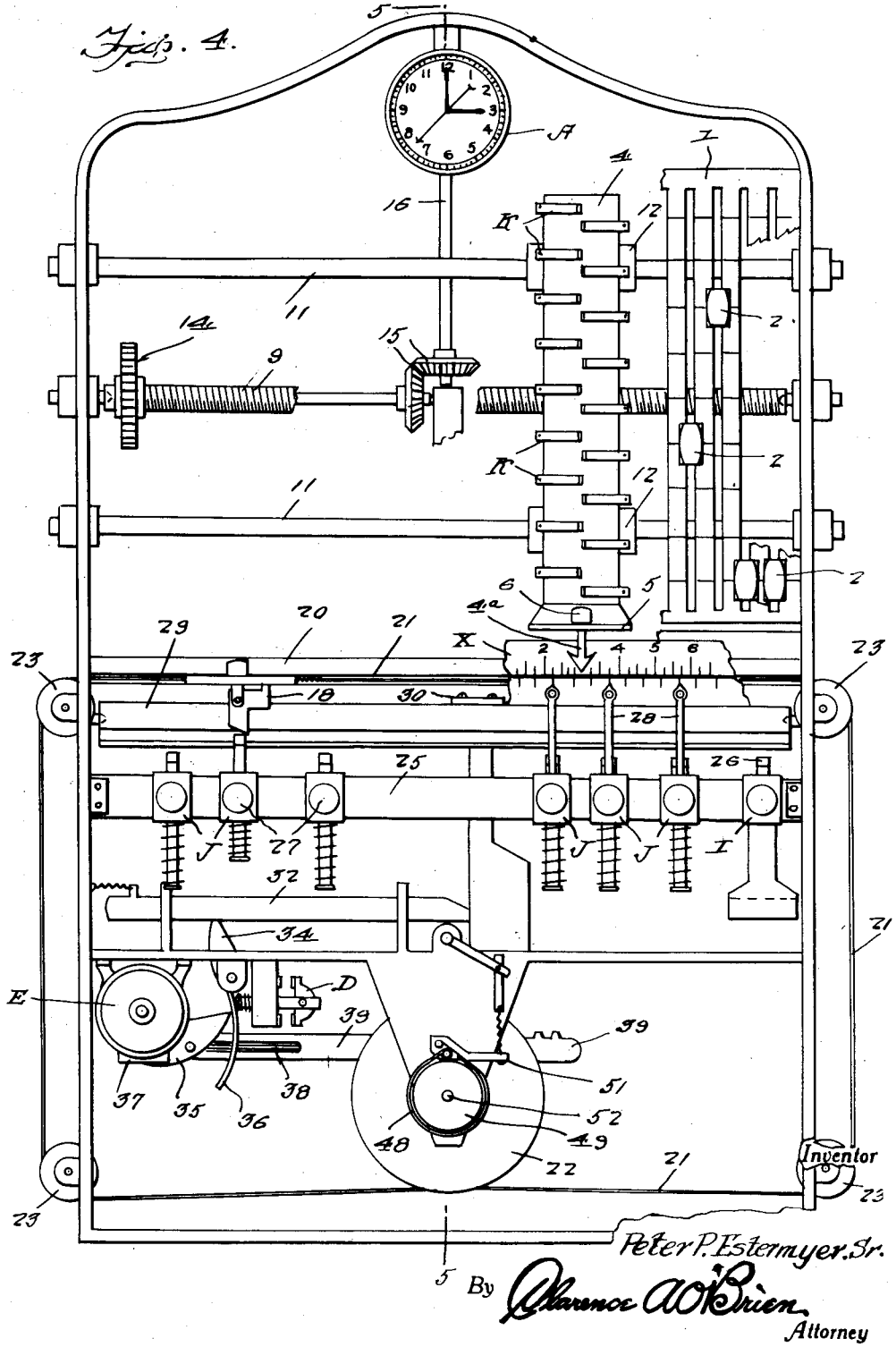

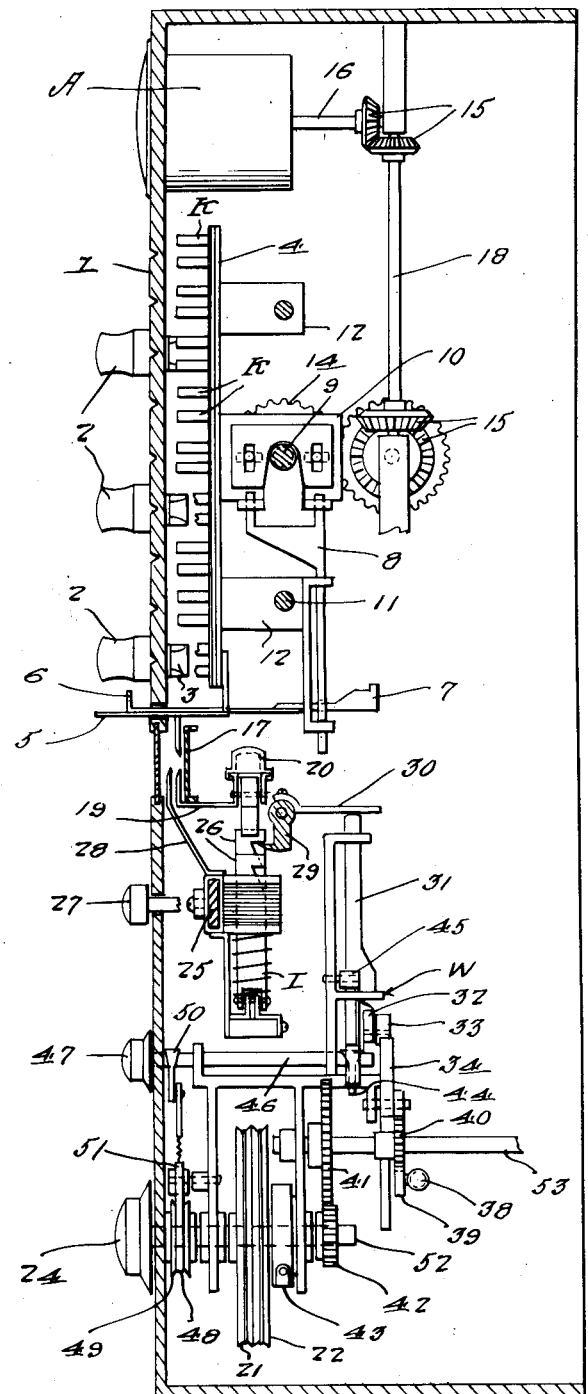

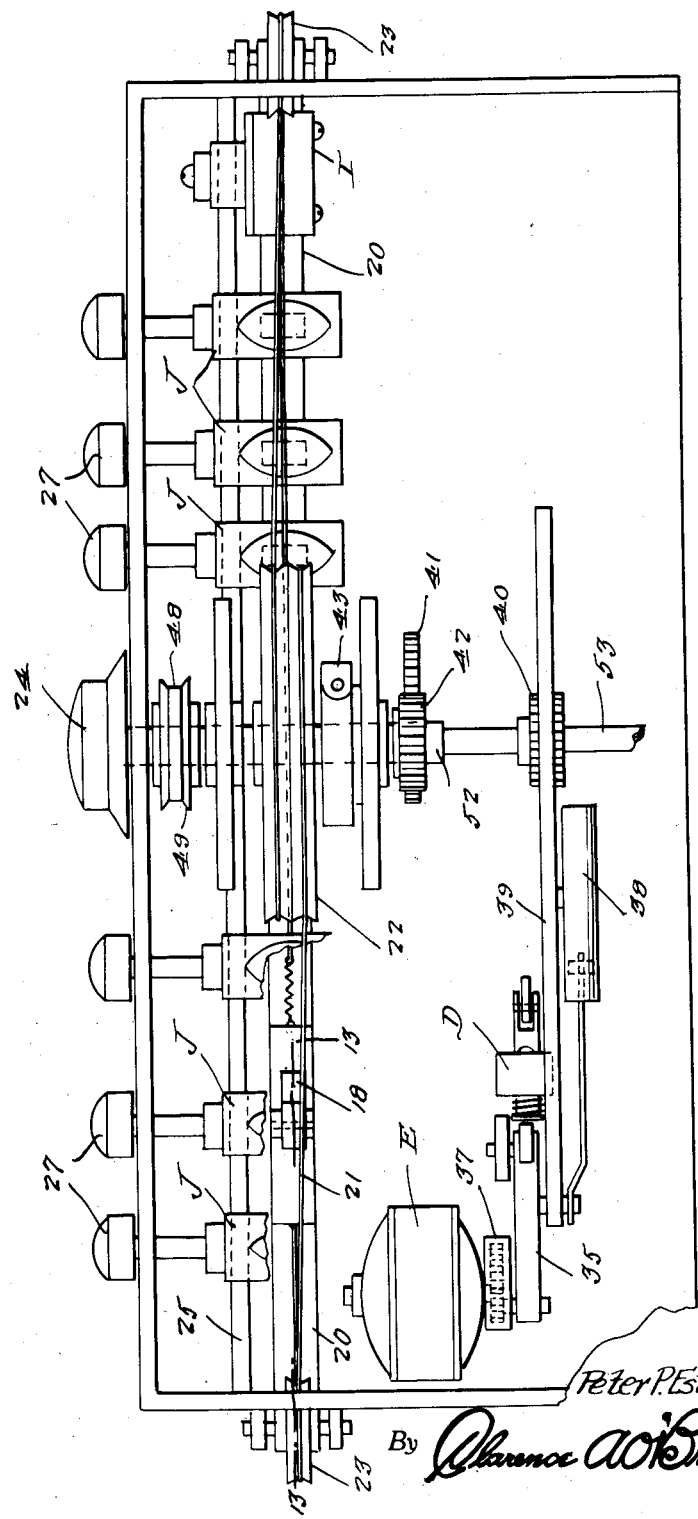

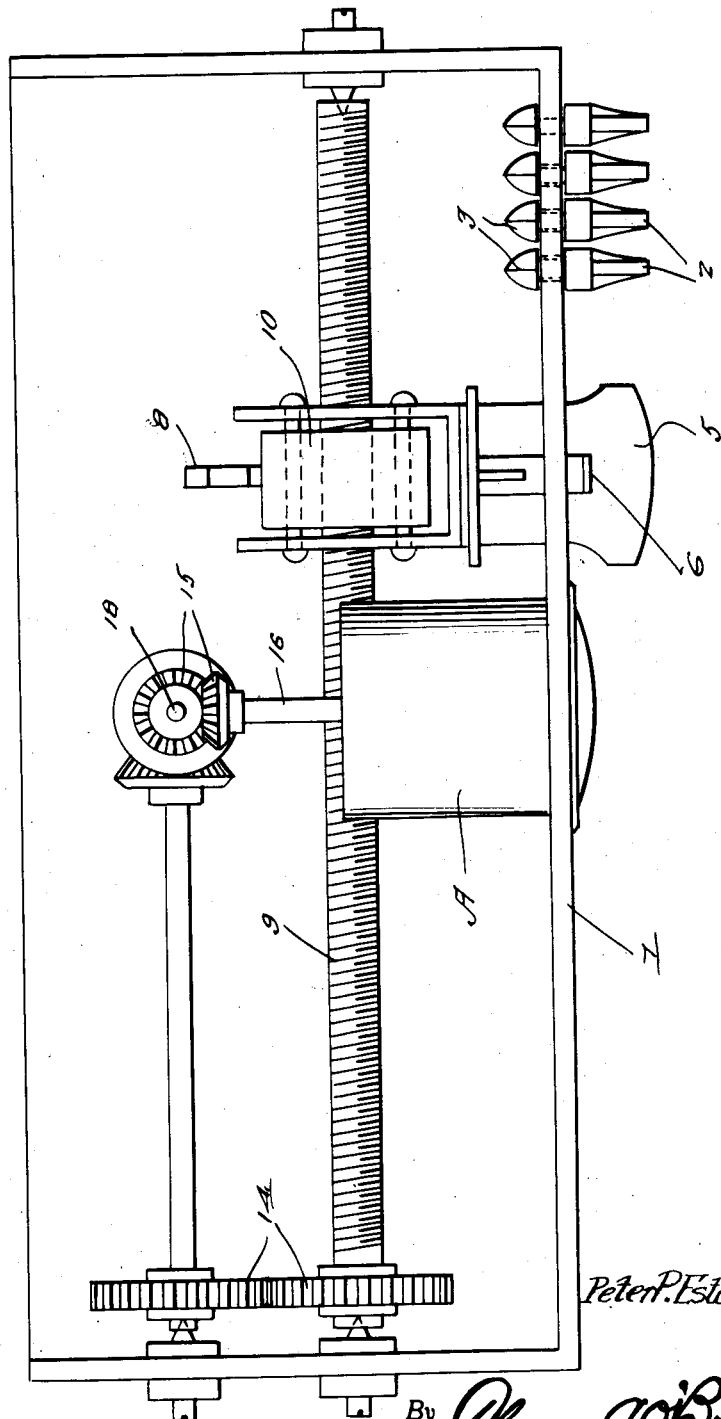

Feb. 23, 1937. P. P. ESTERMYER, SR 2,072,046
AUTOMATIC RADIO RECEIVER
Filed July 13, 1934  9 Sheets-Sheet 8
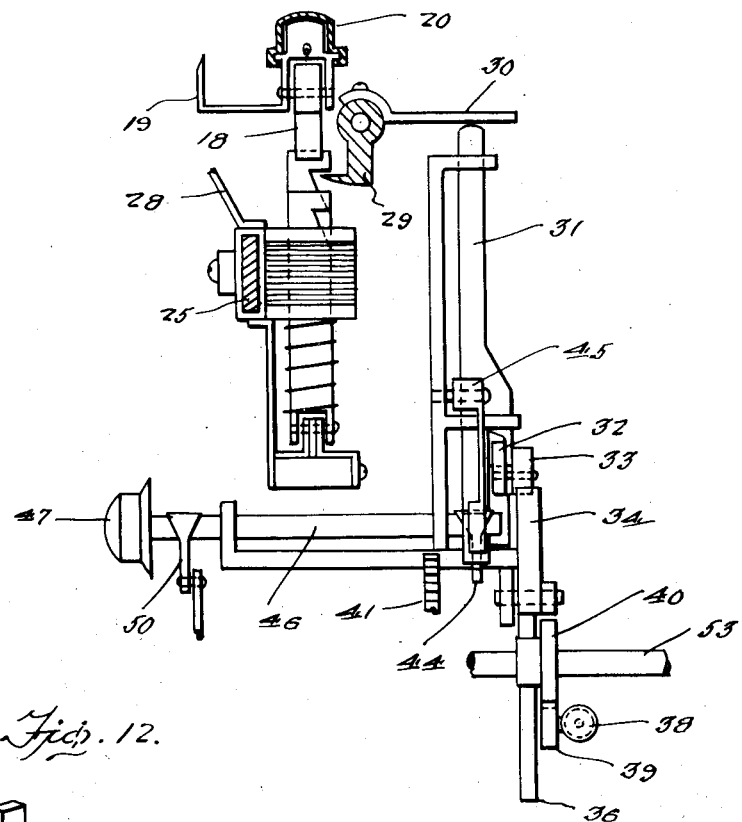
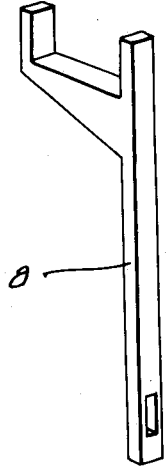
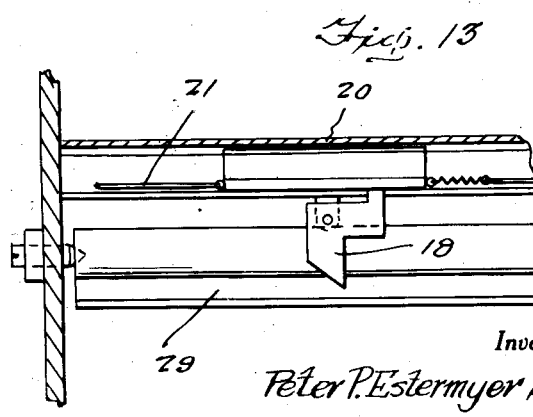
Inventor
Peter P. Estermyer Sr.
By Clarence A. O'Brien
Attorney

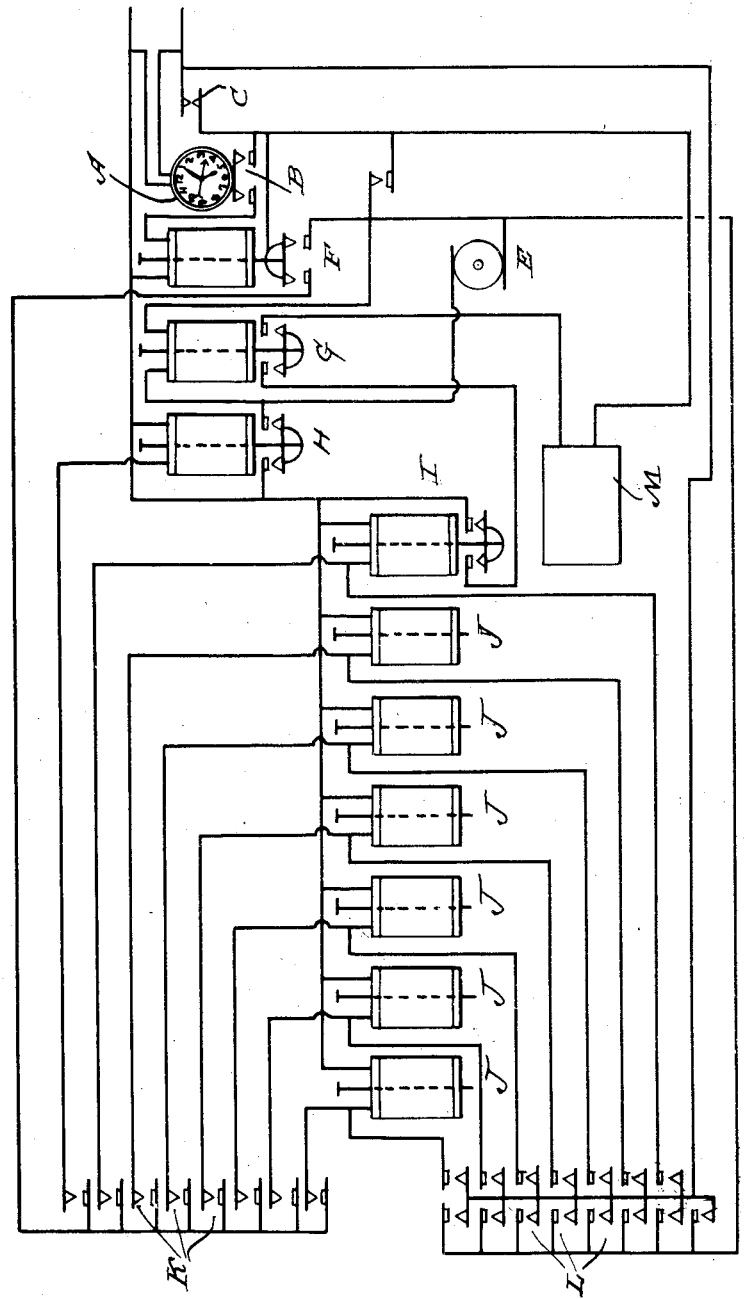

Patented Feb. 23, 1937

2,072,046

UNITED STATES PATENT OFFICE 2,072,046

AUTOMATIC RADIO RECEIVER

Peter P. Estermyer, Sr., Ypsilanti, Mich., assignor of one-half to Charley Ellis, Milan, Mich.

Application July 13, 1934, Serial No. 735,083

1 Claim. (Cl. 161—1)

This invention appertains to new and useful improvements in radio receivers, and more particularly to a receiver wherein automatic means is provided whereby a daily schedule of radio programs may be planned ahead of time.

An important object of the present invention is to provide an automatic radio set which will permit the setting of the controls in such a manner as to cause programs from various stations to be tuned in automatically without any supplemental manipulation aside from the preliminary setting of the mechanism.

Another important object of the present invention is to provide an automatic radio receiver wherein a daily schedule of programs can be planned ahead of time and wherein means is provided for shutting off and turning on the radio set automatically to allow for silent periods when no broadcast is desired.

Still another important object of the present invention is to provide an automatic radio receiver of the type specified which, in construction, is as simple as is mechanically possible in view of the functions and results available.

During the course of the following specification and claims, other important objects and advantages of the invention will become apparent to the reader.

In the drawings:

Figure 3 represents a rear elevational view of the mechanism.

Figure 4 represents a fragmentary front elevational view of the mechanism.

Figure 5 represents a vertical sectional view through the mechanism, taken substantially on line 5—5 of Figure 4, showing certain parts in elevation.

Figure 9 represents a fragmentary top plan view of the mechanism, with certain parts removed.

Figure 10 represents a top plan view of the clock and drive means for the screw shaft.

Figure 11 represents a fragmentary vertical sectional view, showing particularly the cam means and the station solenoid release means.

Figure 12 represents a perspective view of the carriage lift.

Figure 13 represents a fragmentary detailed sectional view, taken substantially on line 13—13 of Figure 9.

Figure 14 represents a diagrammatic view disclosing the electrical connections between the electrical elements involved.

Figure 1:
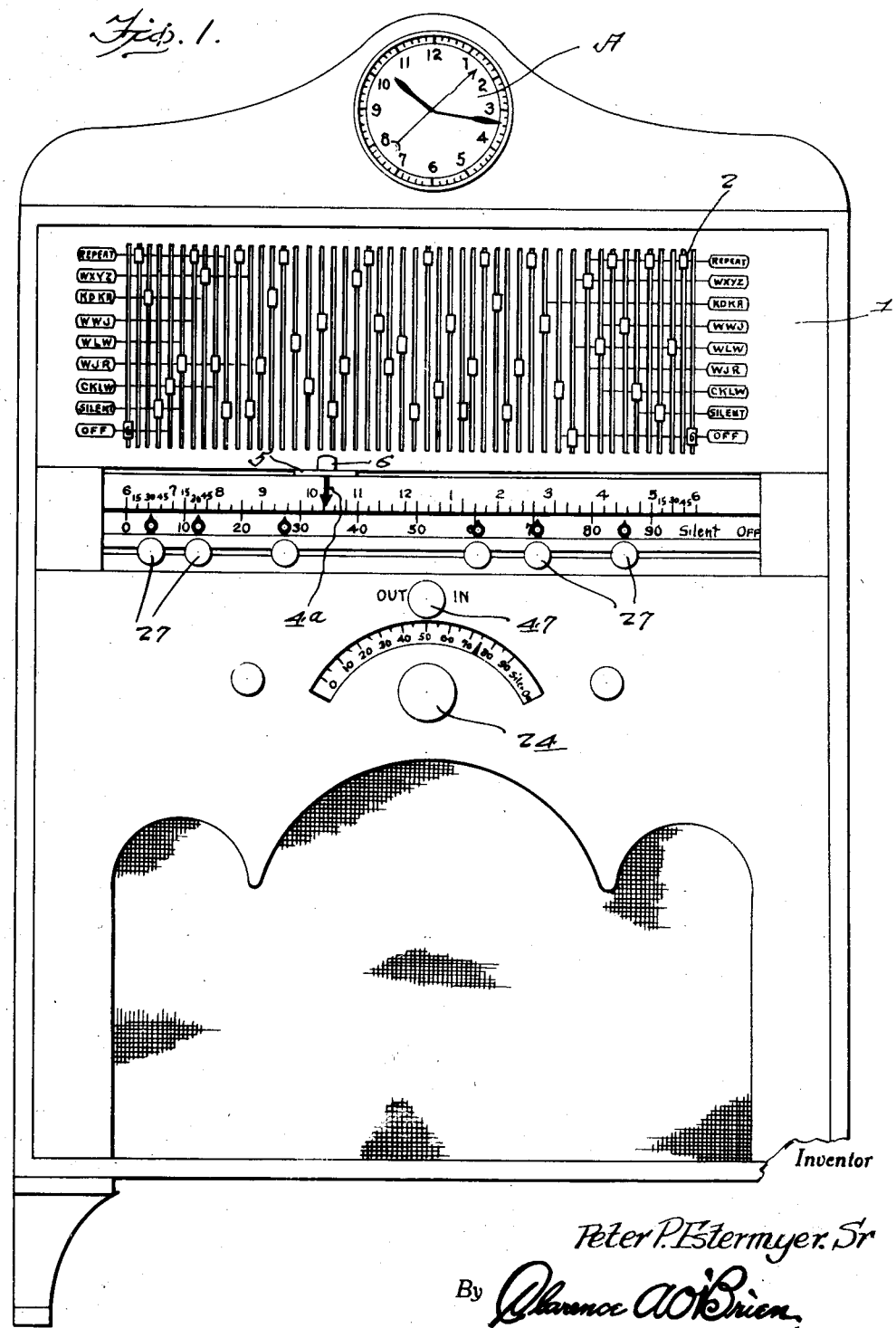
Figure 1 represents a front elevational view of the novel receiver.
Figure 2:
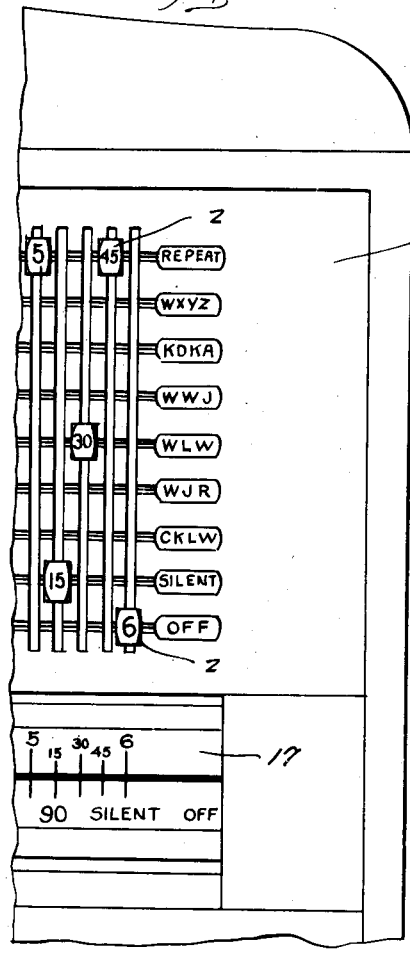
Figure 2 represents an enlarged fragmentary front elevational view of the cabinet, showing the selector buttons.
Figure 6:
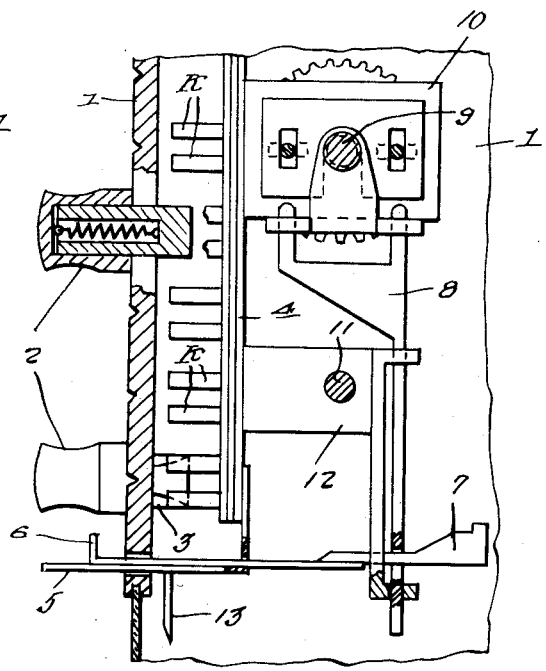
Figure 6 represents a fragmentary vertical sectional view, showing the carriage lifting means.
Figure 7:
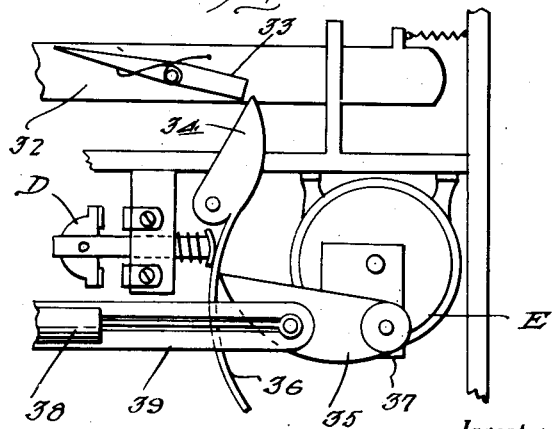
Figure 7 represents a fragmentary elevational view, showing the cam means for the automatic tuner.
Figure 8:
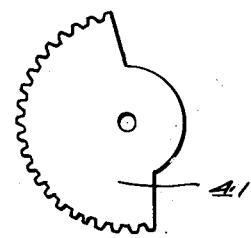
Figure 8 represents an elevational view of the segmental gear employed with the rack shown in Figure 3.

Referring to the drawings wherein like numerals designate like parts, it can be seen that A represents an electric clock which is geared to the traveling contactor carriage screw shaft 9 by means of a shaft 16 and gears 14 and 15. This clock also operates two sets of contacts B which are shown in the diagrammatic view, Figure 14, these contacts being in series and one operated by a 1 R. P. M. gear and the other operated by a 4 R. P. H. gear. These have a duration of contact of about 5 and 35 seconds, respectively. This is so arranged that they will line up and only make contact once every quarter hour. These contacts serve to control a high resistance master solenoid F so that delicate points may be employed by the clock.

The traveling contact carriage 4 operates on smooth slide rails 11, as is clearly shown in Figure 4. This carriage is provided with a pair of open contacts K for each of the station solenoids J, the silent solenoid I and the repeat solenoid H. The contacts K are arranged so that they will follow, respectively, the path of the horizontal channels on the front of the program panel board 1. The carriage is also provided with an indicating pointer 4ª disposed in front of the chart X.

The screw 9, which conveys the carriage, is driven by the clock A and makes one revolution per minute, the same having approximately forty threads per inch, making the carriage travel one and one-half inches per hour. The program selecting buttons 2, being spaced, for instance, ⅜ inch or 15 minutes apart on the program panel board 1 makes it possible to afford program periods of 15 minutes or longer, if desired.

The program panel board 1 is composed of horizontal channels representing radio stations that are to be selected, while the vertical slots represent time intervals, so that when a button is placed at their intersection, that feature of program will be performed at that time.

The master solenoid F is energized by the clock every fifteen minutes, its relay contact points closing the circuit for the motor and contacts on the traveling carriage 4.

The quiet solenoid G is parallel with the motor E and as shown in the diagrammatic view, Figure 14, has its points normally closed, and these are in series with the contacts of the silent solenoid I and open with every cycle of operation. This breaks the radio circuit so that the set may go through the cycle without speaker noises caused by electrical disturbances and by the passing of all stations along the dial.

The repeat solenoid H is energized by a pair of contacts K on the traveling carriage 4 and its points are normally closed and they serve to break the opposite side of the motor and quiet solenoid G circuit, as is apparent in Figure 14. The breaking of the motor circuit stops the cycle of operation and leaves the radio circuit closed, producing an uninterrupted program.

The silent solenoid I is also energized by a pair of contacts K on the traveling carriage 4. This solenoid has the points thereof normally closed and these are in series with the solenoid G contacts. The solenoid I is located on a slide bar 25 and is permanently fixed thereto. When this solenoid I is energized, it breaks the radio circuit and is locked in that position, causing silence for that predetermined period. The armature of the solenoid I is in the path of the traveling stop 18 and this stop prevents it from reaching the "off" position where the master switch C is located. This master switch is mechanically opened by the traveling stop 18 at the end of its travel, that is, if it is allowed to reach this extent of movement.

The station selecting solenoids J are not of the circuit breaking type. These solenoids J are energized by their respective pairs of contacts K on the traveling carriage 4. When energized, they draw their armatures into the path of the traveling stop 18 and thus tune in the respective radio station. Each of the station selecting solenoids J is provided with an adjusting knob 27, as is clearly shown in the drawings.

The lock and release assembly, generally referred to in Figure 5 by W is a combination of a trip, levers and push rods which function with every cycle of the motor E and which actuate the armature lock bar 29 quickly. Of this mechanism, the cam slide 34 has a spring tensioning it against the cam 35, and when allowed to escape from the cam 35, a quick snap is produced by the trip 34 against the dog 33 on the horizontal push bar 32. This pushes against the manual arm lock 45 and releases the manual feature, if it happens to be in use. This operation also takes place on the vertical push bar 31, and opens the station solenoid lock and release bar 39, thus allowing the station solenoid armatures 26 to engage or to escape just as the case may be.

The small motor E with the reducing gears 37 drives the cam 35 and each revolution will be referred to as one cycle. The motor E is started by the master solenoid F which is energized by the clock contacts B. The duration of contact of these clock contact points is insufficient, so the by-pass switch D is brought into play. When the cam 35 allows the cam slide 36 to escape, it also allows the by-pass switch D to close and complete the cycle. The by-pass switch D is also used to end the cycle at the same place by means of the cam slide 36 when the cycle is approaching its completion. The length of the cam slide 36 is to take care of the momentum of the motor E after the by-pass switch D has opened. The cam slide 36 has also a member, the release trip 34 on the other side of its fulcrum. The cam 35 also has an eccentric which draws on the rack arm 39, the action of which will be described hereinafter.

The belt drum 22 is fixed to the same shaft assembly as the tuning knob 24, manual brake drum 49, flat coiled spring 43 and the ratio pinion gear 42. Wound around this drum 22 is a wire belt 21 which extends off over the idler pulley 23 and attaches at its ends to the ends of the traveling stop 18. This stop 18 is capable of traveling from end to end of its slideway 20 when the belt drum 22 is rotated in either direction.

The foregoing assembly also has a countershaft radio tuner 53 which is connected to the tuning instruments of the radio set (not shown). A 180° ratio gear 41 and a rack pinion gear 40 are acted upon by the rack arm 39. The rotation of this belt drum 22 is caused, one way by the motor E and its return by the flat coiled spring 43. With each cycle of operation of the motor E, the cam 35, which draws on the rack arm 39, rotates the rack pinion gear 40, resulting in the rotation of the drum 22, which draws the traveling stop 18 to the extreme end of its slideway 20. This is the first one-half cycle.

The eccentric on the cam 35 is now passing the center of the cycle and the flat coiled spring 43 is recoiling to return the drum 22 and the traveling stop 18 in the opposite direction. Now if a station solenoid J has been energized so that its armature is locked in the path of the traveling stop 18, by the lock bar 29, the traveling stop 18 will have to stop at that point on the dial 17 where that station solenoid J is set. This obviously tunes in the predetermined radio station, while the motor E continues to complete the cycle. The motor cam always makes a complete cycle regardless of where the traveling stop 18 has stopped. The elongated slot in the rack arm, where the eccentric is attached, allows for this action. The dashpot 38 is to overcome any sudden return of the drum 22, caused by the recoil of the flat coiled spring 43 when the traveling stop 18 is released.

The operation of the machine is substantially as follows:—

The radio stations to be automatic have been tuned in and each of the solenoids J set for its respective point on the dial, while the tags have been placed in their respective holders. Progress can now be made toward laying out a schedule.

The program selecting buttons 2 are, for example, set as follows: The first on the "off" channel, the second on one of the radio station channels, the third on the repeat channel, and the fourth on the silent channel, and so on across the panel board, as it may be desired to lay out the program schedule for the entire day.

As previously stated, the clock A conveys the traveling carriage 4 across the panel board, so, therefore, the first button encountered would be the one set in the "off" channel and the others in the sequence above set forth.

With the "off" button engaged, the time has arrived, the clock A bridges the points B, energizing the master solenoid F. The points of the solenoid F close the circuit in which the contacts K are located on the traveling carriage 4 and thus the motor E is started. The motor rotates the cam 35, allowing the cam slide 36 to escape, closing the by-pass switch D and giving a quick snap to the trip 34, drawing on the rack arm 39 and by means of the gears rotating the two shafts. Thus the drum draws on the belt, pulling the traveling stop 18 to one end of the dial. The returning of the traveling stop 18 to the other end opens the master switch C, which turns off the radio set and the automatic system entirely.

Now everything being shut off but the push buttons L and the clock A, which conveys the carriage 4, the carriage continues on across the board and the next button is approached 15 minutes later, which is the one set on one of the radio station channels.

When the master solenoid F closes the circuit of the carriage contacts and the carriage has approached the second button which now has closed a pair of contacts by means of its armature, a circuit is completed with the solenoid J, thus energizing it and drawing its armature in, locking the same in the path of the traveling stop 18, stopping it and the whole drum assembly at that point on the dial, thus tuning in the radio station to which the mechanism has been set.

A station may be held for any length of time without interruption by the automatic feature functioning at its fifteen minute intervals. Without this feature, the station would have to be retuned every fifteen minutes, causing the interruption. When the fifteen minute period has elapsed, the traveling carriage has approached the third button that is placed in the repeat channel and when contacting, closes repeat solenoid H circuit, energizing the same, opening its points, and thus breaking the other side of the motor circuit and preventing a cycle from taking place. As there has been no complete cycle, there has been no release operation, thus leaving the solenoid armature of the station solenoid intact with everything remaining as it is to continue the program undisturbed.

Another fifteen minute period has elapsed and the fourth button that was placed on the silent channel has been approached and when contacted, closes the silent solenoid I contacts, energizing this solenoid and causing the pulling in of its armature, which results in the breaking of the radio circuit. The release operation, functioning this time, allows the armature from the previous operation to escape and the silent solenoid armature to be engaged by the lock mechanism, generally referred to by W, causing silence for that period, but leaving the automatic system intact to follow the laid out schedule across the panel board.

If desired, the mechanism can be entirely made inoperative from an automatic standpoint and operated manually, simply by locking the shaft 52. In reference to this, the manual knob 47 is employed when operating the set manually. The shaft of this knob has the eccentric arms 50—44 thereon. By turning the knob, the arm 50 draws up on the brake band 48 and causes the belt drum 22 to become fixed. The arm 44 acts on the vertical push bar 31, causing the lock and release bar 29 to be actuated and the manual release arm lock 45 holds it in that position. This allows the solenoid armatures 26 to escape or be freed of this bar 29 whenever they are subsequently operated. In this manner, the traveling stop 18 has a free range of travel.

The tuning knob 24 is used to manually tune the set and it is connected to the belt drum assembly, hence directly to the radio set.

The station solenoid knobs 27 are to slide the station solenoids J on the station solenoid bar 25 to the desired point on the dial 17. These knobs can then be tightened so that when a station solenoid J is energized, its armature 26 will engage with the lock and release bar 29 and stop the traveling stop 18, thus tuning in a radio station at that desired point. The same applies to the rest of the station solenoids J so that various radio stations may be tuned in automatically.

The traveling contactor handle 5 is to slide the carriage 4 on its slideway 11 to the corresponding time of the clock A. This is done by drawing out the disengaging handle 6, causing the lift 7 to raise the bar 8, thus disengaging the open nut 10 from the threaded feed 9 and freeing the carriage 4 to slide at will.

The program selector buttons 2 each represent a specified time. These buttons are to select the various programs from the various radio stations at the selected time. Each button 2 has a contactor 3 directly opposite on the back of the panel board 1, and when placed in the path of a pair of contacts K, the carriage, in passing, will make contact therewith and energize the corresponding solenoid.

The push buttons L, shown in the diagrammatic view, Figure 14, can be placed anywhere desired on or off the apparatus and serve as an alternative for the contacts K when the set is to be operated by remote controls. The push buttons L always remain in active position so that the automatic schedule may be recalled and resumed or retuned from the various locations at will.

Obviously, the foregoing apparatus can be used in conjunction with television apparatus, radio beacon stations and also for use in aviation, railways and for police use.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In an automatic radio receiver, a time mechanism drive shaft, a carriage movable by said shaft in a horizontal direction, a panel behind which said carriage is operative, said panel being provided with vertical parallel slots, a row of contacts on the carriage opposed to the panel and extending longitudinally of the slots, said panel being provided with the names of broadcasting stations arranged in a vertical row at one side of the slots, said panel being provided with horizontal grooves, one extending from each of the names and intersecting said slots, contacts longitudinally slidable in the slots, each of the last-mentioned contacts being provided with a spring contracted button having a portion thereof engageable in the said grooves to retain the last-mentioned contact in a definite position in its slot and in the path of the desired contact on the carriage.

PETER P. ESTERMYER, Sr.